Aug. 3, 1926.
W. C. STEVENS
1,594,859
APPARATUS FOR THE MANUFACTURE OF LAMINATED RUBBER SHEETING
Original Filed April 22, 1920
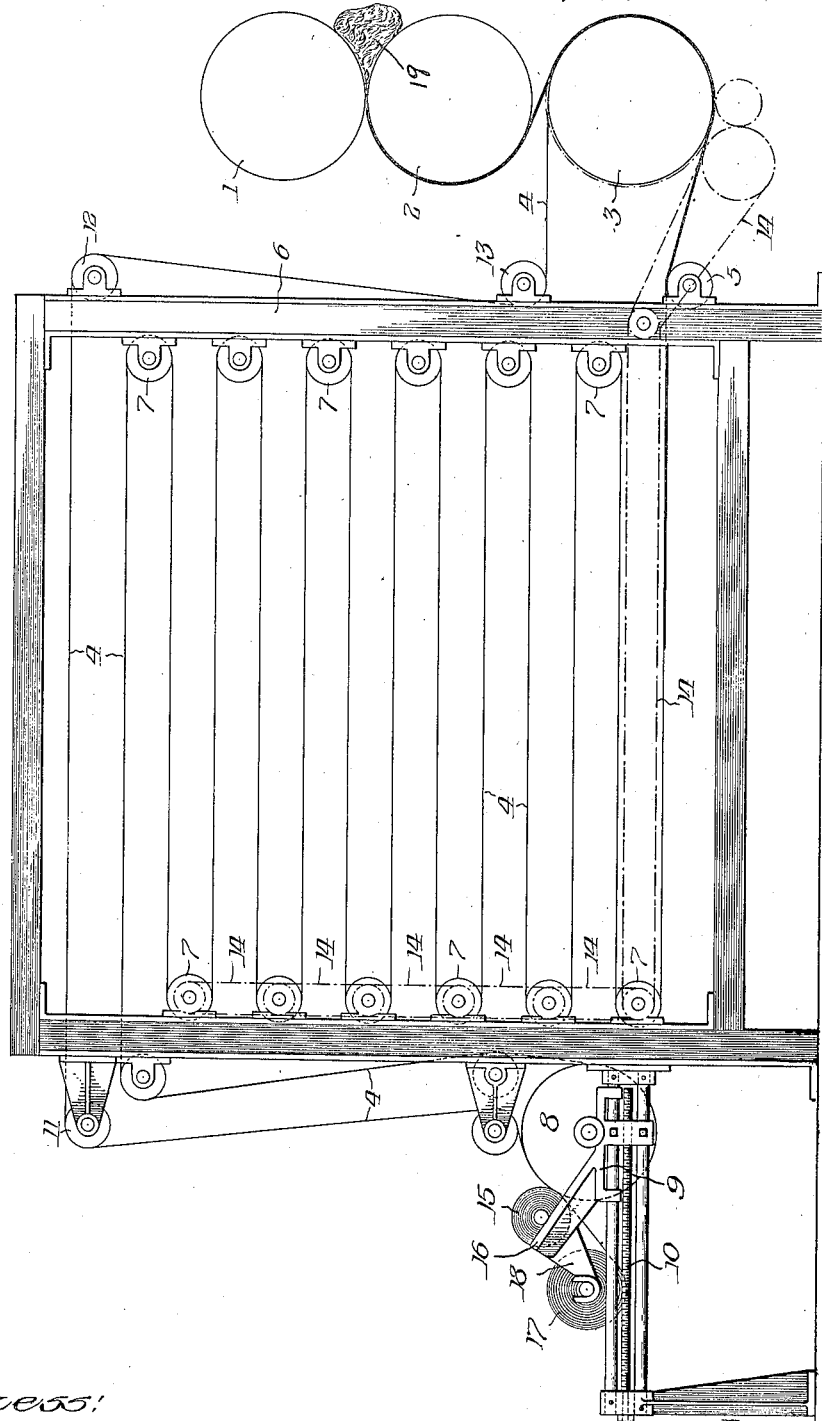

Patented Aug. 3, 1926.

1,594,859

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

APPARATUS FOR THE MANUFACTURE OF LAMINATED RUBBER SHEETING.

Application filed April 22, 1920, Serial No. 375,757. Renewed July 6, 1923.

This invention relates to an apparatus and method for forming rubber stock or sheet rubber in laminated form for the purpose of manufacturing inner tubes or side walls for pneumatic tires or for other purposes and is designed to increase the productiveness of the calendering apparatus by which the rubber is roller into sheets and furnish a better and more uniform rubber sheeting.

It has been the practice heretofore to build up layers of rubber into a laminated sheet by calendering a thin sheet and rolling it in a liner. After the required length of sheet, usually fifty yards, has been rolled, the calendering operation is stopped, the sheet of rubber cut and then run through the calender again in the opposite direction, a new layer of rubber being superposed on the first sheet. This is repeated as often as required, it being the practice to lay up three or four plies of rubber in this manner, laminated rubber sheeting possessing advantages, due to the several plies, in the way of withstanding strains to which a tube is subjected.

It will be seen that the old method of manufacturing rubber sheeting possesses many disadvantages as the roll on which the sheeting is wound up with the liner has to be handled each time a new ply is laid up and the rubber must be threaded through the calender, an operation requiring skill and deftness of operation. By the method which will be described the calendering and laying up of the rubber sheeting is performed as a continuous operation until the required number of plies have been laid up.

In the figure of the drawing is shown, somewhat diagrammatically, an apparatus for carrying out the process.

At the right of the figure, 1, 2, and 3 represent the calender rolls, the bank of rubber 19 being between the upper two rollers 1 and 2, the roll 3 being the one on which the rubber is laid on the sheet.

A continuous belt or sheet 4 passes around the lower roll 3, then over a guide roll 5 which is mounted on a frame-work 6, and then back and forth over a plurality of rolls 7 for the distance required, the said rolls being carried in the frame-work 6. Upon reaching the top of the frame-work, the belt is led down over a large winding roll 8. This latter roll is slidably mounted in carriages 9 at the side of the framework opposite the calender rolls and may be adjusted by threaded shafts 10 to take up slack in the belt.

From the roll 8 the belt passes up again to a roll 11 on the top of the framework, across to a roll 12, and down over a roll 13 near the roll 5 to the starting point.

The several rolls may be driven in any preferred manner at the same speed as the calender rolls, gears, and sprockets, and sprocket chains for this purpose being indicated by the dot-and-dash lines 14.

The hot sheet of rubber is attached to the belt by which it is supported and led through the apparatus to the roll 8 and back to the calender at which point a second sheet is laid on the first. The belt with the rubber attached to it is led around in the manner described until a sufficient number of plies have been laid up, when it is ready to be removed. This operation is performed by mounting a take off roll 15 resting against the rollers 8 on arms 16. A liner roll 17 is supported in hanger 18, the liner passing from the roller 17 to the rubber and being wound up with it.

It will be seen that by the use of the apparatus described a multiple-ply rubber sheet may be laid up rapidly and efficiently. During the travel of the rubber through the apparatus it becomes sufficiently cooled so that the succeeding rubber sheets may be laid up.

The apparatus here shown permits of many modifications and alterations and such as fall within the scope of the invention are intended to be included in the claims.

I claim:

1. An apparatus of the character set forth, comprising a set of calender rolls, a framework, a plurality of guiding rolls on said framework, a winding roll, a belt passing around said rolls, and means adapted to contact with said winding roll to remove the rubber sheet from the belt.

2. Apparatus of the class described comprising the combination with a calender of an endless belt passing between the lower rolls thereof, and means for conducting said belt over a zigzag path adjacent said calender.

3. Apparatus of the class described comprising the combination with a calender of an endless belt passing between the lower rolls thereof, a frame adjacent said calender, and rollers journaled in said frame adapted to support said belt for travel in a zigzag path.

4. Apparatus of the class described comprising a calender, an endless belt passing between the lower rolls thereof, means for conducting said belt over a zigzag path adjacent said calender, and means cooperating with said belt after it has traveled over said zigzag path and before it returns to said calender for removing rubber sheeting from said belt.

WILLIAM C. STEVENS.